(12) United States Patent
Miyazawa et al.

(10) Patent No.: US 7,515,360 B2
(45) Date of Patent: Apr. 7, 2009

(54) LENS BARREL AND LENS BARREL SYSTEM

(75) Inventors: Takashi Miyazawa, Hachioji (JP); Daisuke Shiraishi, Hachioji (JP)

(73) Assignee: Olympus Corporation, Tokyo (JP)

(*) Notice: Subject to any disclaimer, the term of this patent is extended or adjusted under 35 U.S.C. 154(b) by 177 days.

(21) Appl. No.: 11/598,762

(22) Filed: Nov. 14, 2006

(65) Prior Publication Data
US 2007/0115566 A1 May 24, 2007

(30) Foreign Application Priority Data
Nov. 22, 2005 (JP) ............................. 2005-337622

(51) Int. Cl.
G02B 7/02 (2006.01)
G02B 15/14 (2006.01)

(52) U.S. Cl. .................................. 359/811; 359/701

(58) Field of Classification Search ......... 359/699–701, 359/703–704, 811, 813, 815, 819, 822–823, 359/826–827, 829–830
See application file for complete search history.

(56) References Cited

U.S. PATENT DOCUMENTS 3,758,198 A * 9/1973 Kanie et al. ................. 359/828
2003/0234986 A1* 12/2003 Takagi et al. ................ 359/700

FOREIGN PATENT DOCUMENTS

JP 8-160277 A 6/1996
JP 9-211286 A 8/1997

* cited by examiner

*Primary Examiner*—Scott J Sugarman
*Assistant Examiner*—Dawayne A Pinkney
(74) *Attorney, Agent, or Firm*—Westerman, Hattori, Daniels & Adrian, LLP.

(57) ABSTRACT

A lens barrel comprises a first frame member having a plurality of cam grooves, a second frame member having a first cam follower and a second cam follower fitted to the plurality of cam grooves, respectively, and an external contact member projecting externally from the end surface of the second frame member, having a center axis along a direction which the second frame member extends, in the direction of the center axis in a region sandwiched between a first plane including the center axis and the first cam follower and a second plane including the center axis and the second cam follower adjacent to the first cam follower.

7 Claims, 9 Drawing Sheets

LENS BARREL AND LENS BARREL SYSTEM

This application claims benefit of Japanese Application No. 2005-337622 filed on Nov. 22, 2005, the contents of which are incorporated by this reference.

BACKGROUND OF THE INVENTION

1. Field of the Invention

The present invention relates to a lens barrel and a lens barrel system to which a lens barrel external attachment member can be detachably mounted.

2. Related Art Statement

Heretofore, there are various proposals as to a protection structure for protecting a lens barrel against shock force due to drop and the like. A proposal disclosed in Japanese Unexamined Patent Application Publication No. 8-160277 relates to a lens barrel having a moving ring, which is supported in a fixed cylinder so as to move forward and rearward therein for holding a variable lens, and a cam cylinder for moving the moving ring forward and rearward. A roller (cam follower) is disposed to the outer periphery of the moving ring so that it can be slidably inserted into a cam groove formed to the fixed cylinder and the cam cylinder. The roller is attached to the moving ring through an elastically deformable sheet member. Accordingly, when shock force acts on the moving ring due to drop and the like, the shock force is absorbed by the sheet member being elastically deformed, thereby the roller is prevented from being removed from the cam groove, and the cam groove is prevented from being damaged.

Further, a proposal disclosed in Japanese Unexamined Patent Application Publication No. 9-211286 relates to a lens barrel in which a plurality of slots are formed along the peripheral direction of a synthetic resin cylindrical member mounted to the extreme end portion of the lens barrel. The slots have such a shape that they can be elastically deformed in the axis direction of the cylindrical member, and projections are formed to front positions of the slots. Further, a filter frame for mounting a filter is inserted into the extreme end of the cylindrical member so that the projections are abutted against the filter frame. In the lens barrel, when shock force acts on the filter frame due to drop and the like, the slots are elastically deformed through the projections so as to absorb the shock force. Accordingly, the cylindrical member or incorporated parts coupled with the cylindrical member can be prevented from being deformed and damaged.

SUMMARY OF THE INVENTION

A lens barrel or a lens barrel system according to the present invention is characterized in that stable strength can be obtained regardless of an attitude when dropped and a change of an acting state of shock force while suppressing the number of components.

A lens barrel of the present invention has a first frame member having a plurality of cam grooves, a second frame member having a first cam follower, and a second cam follower fitted to the plurality of cam grooves, respectively, and an external contact member projecting externally from the end surface of the second frame member, having a center axis along a direction which the second frame member extends, in the direction of the center axis in a region sandwiched between a first plane including the center axis and the first cam follower and a second plane including the center axis and the second cam follower adjacent to the first cam follower.

A lens barrel system according to the present invention has a lens barrel having a first frame member including a plurality of cam grooves, a second frame member including a first cam follower and a second cam follower fitted to the plurality of cam grooves, respectively, and an attachment portion for positioning and fixing an external attachment member, and a lens barrel external attachment member having a fitting portion fitted to the attachment portion and an external contact member projecting externally from the end surface of the second frame member, having a center axis along a direction which the second frame member extends, in the direction of the center axis in a region sandwiched between a first plane including the center axis and the first cam follower and a second plane including the center axis and the second cam follower adjacent to the first cam follower when the attachment portion is fitted to the fitting portion so that they are positioned and fixed.

Other features and advantages of the present invention will be apparent from the following description.

BRIEF OF DESCRIPTION OF THE DRAWINGS

DETAILED DESCRIPTION OF THE PREFERRED EMBODIMENT

Embodiments of the present invention will be described below with reference to the drawings.

Figure 1:
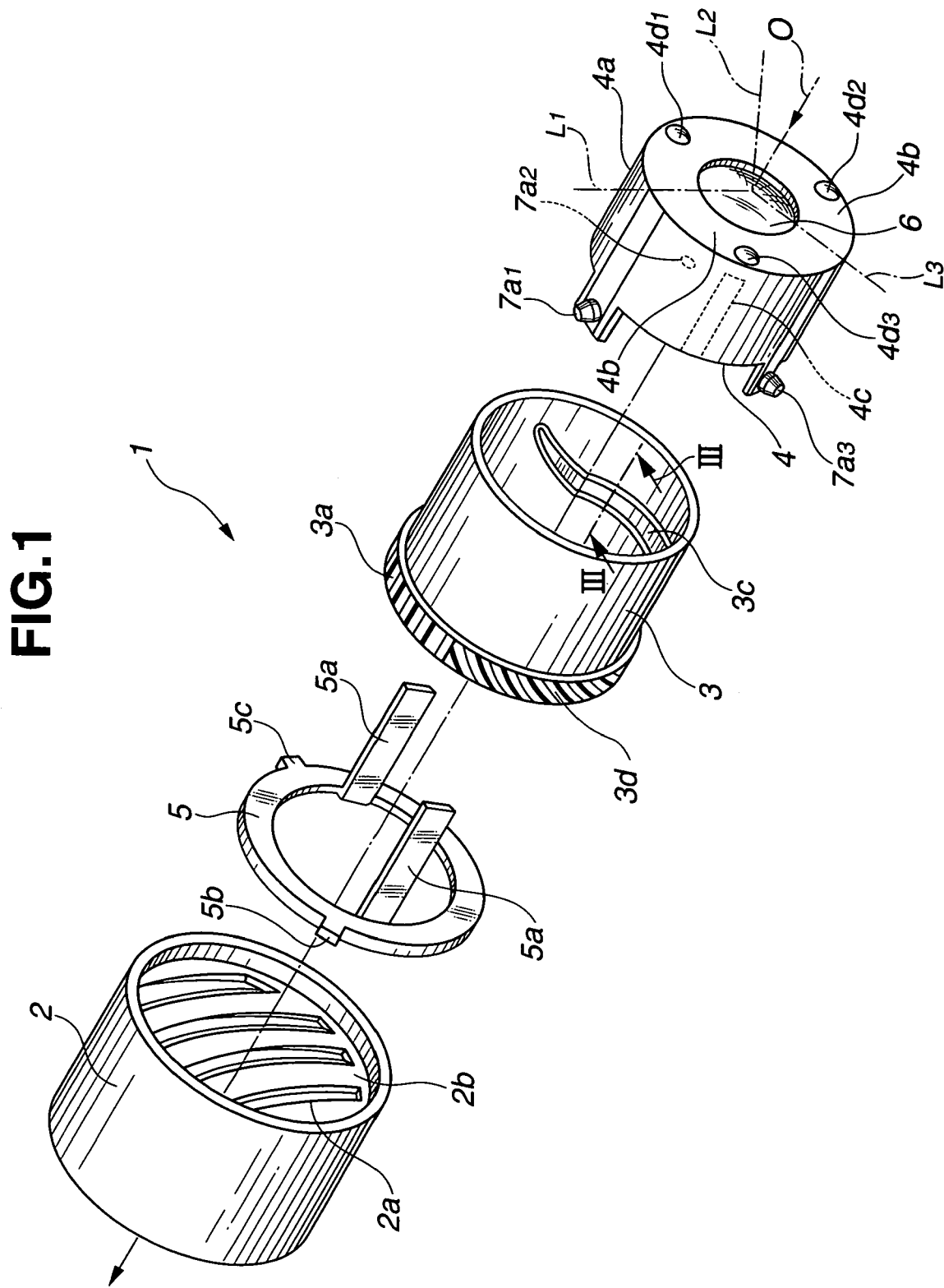
FIG. 1 is an exploded perspective view of a lens barrel of a first embodiment of the present invention.
Figure 2:
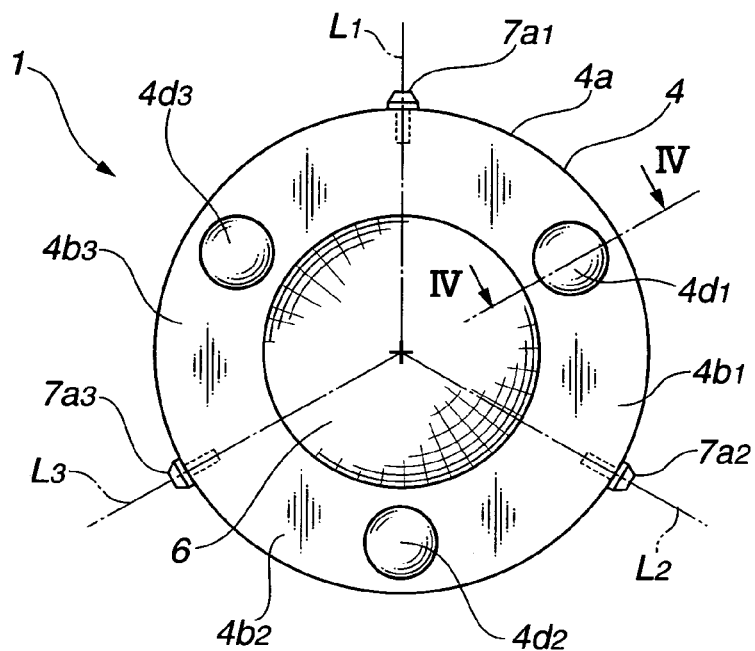
FIG. 2 is a front elevational view of a linearly moving frame of the lens barrel of FIG. 1.
Figure 3:
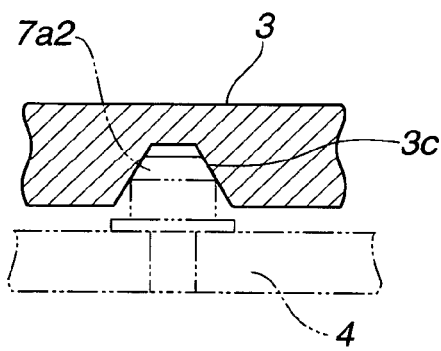
FIG. 3 is a sectional view taken along the line III-III of FIG. 1 and shows a sectional shape of a cam groove of a rotary frame of the lens barrel of FIG. 1.
Figure 4:
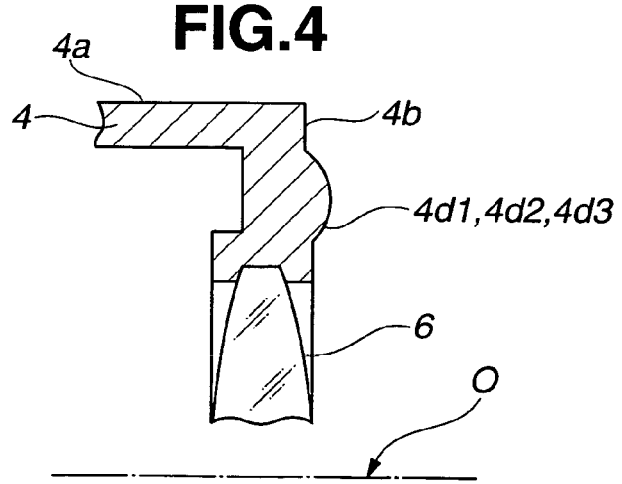
FIG. 4 is a sectional view taken along the line IV-IV of FIG. 2 and shows a sectional shape of the extreme end portion of the linearly moving frame of FIG. 2.
Figure 5:
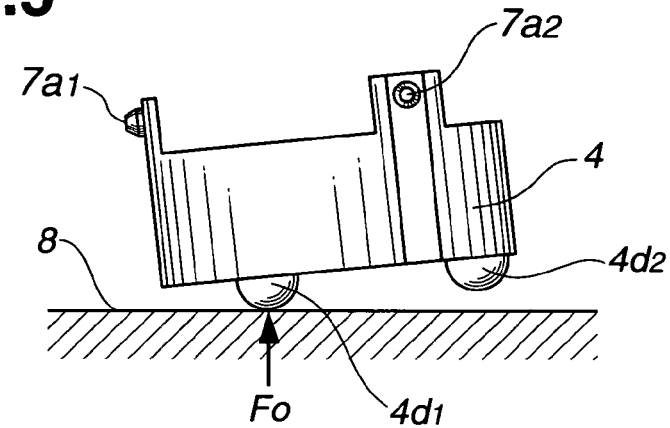
FIG. 5 is a view showing a state in which the linearly moving frame of the lens barrel of FIG. 1 is hit against an obstacle.

FIG. 1 is an exploded perspective view of a lens barrel of a first embodiment of the present invention. FIG. 2 is a front elevational view of a linearly moving frame of the lens barrel. FIG. 3 is a sectional view taken along the line III-III of FIG. 1 and shows a sectional shape of a cam groove of a rotary frame in the lens barrel. FIG. 4 is a sectional view taken along the line IV-IV of FIG. 2 and shows a sectional shape of the extreme end portion of the linearly moving frame. FIG. 5 is a view showing a state in which the linearly moving frame of the lens barrel is hit against an obstacle.

The lens barrel 1 has a fixed frame 2 fixed to a camera body side, a metal or resin cylindrical rotary frame 3 as a first frame member inserted into the fixed frame 2 so that it can rotate and move forward and rearward therein, a metal or resin cylindrical linearly moving frame 4 as a second frame member inserted into the rotary frame 3 and moved forward and rearward by the rotary frame 3 in a state in which it is linearly movably guided with respect to the fixed frame 2, and a linear movement guide key 5 for linearly movably guiding the linearly moving frame 4. The rotary frame 3 and the linearly moving frame 4 have a center axis that is in agreement with the optical axis O of an image pick-up lens 6 held by the linearly moving frame 4. Although the center axis is not always in agreement with the optical axis O depending on a structure of the lens barrel, the center axis and the optical axis O are axes that are at least approximately parallel with each other. Further, in the following description, it is assumed that a subject side in the optical axis O is a front side.

A female helicoid screw 2a and a linear movement guide groove (not shown) are formed to the inner periphery of the fixed frame 2 as well as a peripheral direction guide groove 2b is formed to a front portion of the inner periphery of the fixed frame 2. Further, a drive gear (not shown) is disposed in the inner periphery to rotatably drive the rotary frame 3.

A gear portion 3a, which is meshed with the drive gear, and a male helicoid screw 3b, which is threaded with the female helicoid screw 2a of the fixed frame 2, are disposed to a rear portion of the outer periphery of the rotary frame 3 in a superimposed state, and three cam grooves 3c (only one of them is shown) which, move obliquely with respect to the optical axis O, are disposed to the inner periphery of the rotary frame 3.

The linearly moving frame 4 holds an image pick-up lens 6 having the optical axis O, three cam followers 7a1, 7a2, 7a3 are disposed at three divided positions of a rear portion of the outer periphery of the linearly moving frame 4 so as to constitute a first or second cam follower which is slidably inserted into the cam grooves 3c of the rotary frame 3, and two linear movement guide grooves 4c, which are parallel with the optical axis O are formed to the inner periphery of the linearly moving frame 4. It is assumed that the cam followers 7a1, 7a2, 7a3 are inserted into the cam grooves 3c each having a taper surface of the rotary frame, respectively as shown in FIG. 3.

Further, as shown in FIGS. 2, 4, three convex-spherical-shaped projections 4d1, 4d2, 4d3 are disposed on a front end surface 4b of the linearly moving frame 4 in relation to the positions of the cam followers 7a1, 7a2, 7a3. The convex-spherical-shaped projections 4d1, 4d2, 4d3 project in the forward direction of the optical axis O and form external contact members.

That is, the projections 4d1 is disposed to a third plane region that is sandwiched by a first plane, which passes through the optical axis O in agreement with a center axis direction in which the linearly moving frame 4 extends and the center axis of the cam follower 7a1, and a second plane, which passes through the optical axis O and the center axis of the cam follower 7a2, and is surrounded by the outer periphery 4 and a lens opening portion. Specifically, in FIG. 2, the projection 4d1 is disposed to a region 4b1 which is surrounded by a line L1 passing through an extending line in the optical axis O direction at the center of the cam follower 7a1 on the front end surface 4b and the optical axis O and a line L2 passing through an extending line in the optical axis O direction at the center of the cam follower 7a2 and the optical axis O.

Likewise, the projection 4d2 is also disposed to a region 4b2 surrounded by a line L2 on the front end surface 4b and a line L3 passing through an extending line in the optical axis O direction at the center of the cam follower 7a3 and the optical axis O in FIG. 2. Further, the projection 4d3 is also disposed to a region 4b3 surrounded by the line L3 and the line L1 on the front end surface 4b in FIG. 2.

The linear movement guide key 5 includes projections 5b, 5c which project to the outer periphery of an annular portion and are inserted into the linear movement guide groove of the fixed frame 2 and two linear movement guides 5a extending in the forward direction of the optical axis O (on the image pickup lens side).

The linear movement guide key 5 is attached to a rear end surface of the rotary frame 3 in a state in which the projections 5b, 5c are inserted into the inner periphery of the fixed frame 2, can be relatively rotated with respect to the rotary frame 3 in the rotational direction thereof, and supported integrally with the rotary frame 3 in the optical axis O direction. Then, the projections 5b, 5c are slidably inserted into linear movement grooves of the fixed frame 2, and the linear movement guides 5 are slidably inserted into the linear movement guide grooves 4c of the linearly moving frame 4.

In the lens barrel 1 having the above arrangement, when the rotary frame 3 is turned in a predetermined direction by a predetermined angle through the drive gear in a state in which the rotary frame 3 and the linearly moving frame 4 are moved into the fixed frame 2, after the rotary frame 3 is moved forward from the fixed frame 2 while being turned through the female helicoid screw 2a, gear portion 3 and the male helicoid screw 3b are inserted into the peripheral direction guide groove 2b of the fixed frame 2. The linearly moving frame 4 is moved forward together with the rotary frame 3 through the cam grooves 3c and the cam followers 7a1, 7a2, 7a3 and further linearly moved forward to a wide position which projects from the rotary frame 3 and at which photographing can be carried out. Thereafter, the linearly moving frame 4 moves forward and rearward between the wide position and a tele position by further turning the rotary frame 3.

In a state in which the linearly moving frame 4 of lens barrel 1 is moved into the fixed frame 2 described above and in a state in which it is moved to the wide position or the tele position at which photographing can be carried out, the front end surface 4b of the linearly moving frame 4 is exposed to the front surface of the lens barrel 1 at all times, and the projections 4d1, 4d2, 4d3 are in a state in which they can be hit against the outside.

When the lens barrel 1 is in a forwardly or inwardly moved state (however, when the lens barrel 1 is of a collapsible barrel type, only when the lens barrel 1 is in a forwardly moved state), if the linearly moving frame 4 is dropped onto an external obstacle 8, for example, a floor and the ground with its front end surface 4b side facing downward, any one or a plurality of the projections 4d1, 4d2, 4d3 are hit against the external obstacle 8 at the beginning of collision as shown in FIG. 5, and shock force F0 of collision is received between at least any two of the cam follower 7a1, 7a2, 7a3 of the linearly moving frame 4 and the cam grooves 3c of the rotary frame 3.

If a conventional lens barrel, in which the projections 4d1, 4d2, 4d3 described above are not disposed to a linearly moving frame, is dropped just below a pin or in the vicinity of it, the shock force thereof acts on a single cam follower. When cam grooves 3c have a taper surface as described above, component force is generated between the cam grooves 3c and cam followers 7a1, 7a2, 7a3 in a direction where the cam grooves 3c are disengaged from the cam followers. Accordingly, there is a possibility that the linearly moving frame or a rotary frame is deformed and disengaged from the cam grooves 3c or the cam grooves 3c are scratched or the cam followers are damaged.

In contrast, in the lens barrel of the first embodiment, since the projections 4d1, 4d2, 4d3 are disposed in the regions 4b1, 4b2, 4b3 between the cam followers 7a1, 7a2, 7a3 as described above, even if the shock force F0 acts on any of the projections 4d1, 4d2, 4d3, the shock force F0 can be received by at least first and second adjacent cam followers after dispersed thereto. Accordingly, force receive by a single cam follower is reduced, thereby it is possible to suppress occurrence of a disadvantage such as disengagement and breakage of the cam followers, damage of the cam grooves, and the like.

Note that in the first embodiment, the projections 4b1, 4b2, 4b3 are disposed integrally with the linearly moving frame 4. However, the first embodiment is not limited thereto, and the same advantage can be obtained even if such an arrangement that the projections 4d1, 4d2, 4d3 are disposed on, for example, a sheet-shaped member such as a decorated sheet and the like bonded on the front surface end of the linearly moving frame 4. Further, although the projections 4d1, 4d2, 4d3 of the first embodiment are formed in the spherical shape, the same advantage can be obtained even if they are formed to a convex shape other than it.

As described above, according to the lens barrel 1 of the first embodiment, the lens barrel having high shock resistance against drop can be obtained only by disposing the projections 4d1, 4d2, 4d3 to the linearly moving frame 4 at predetermined positions. Further, since the plurality of projections 4d1, 4d2, 4d3 are disposed in correspondence to the plurality of cam followers 7a1, 7a2, 7a3, the projections can cope with the drop of the lens barrel 1 even if it drops in any attitude inclining in any of directions. Further, since the projections can be formed in a very small space and the number of parts can be suppressed, there can be provided the lens barrel with high shock resistance without obstructing compact arrangement of the lens barrel.

Next, a lens barrel of a second embodiment of the present invention will be described using FIGS. 6 to 8.

Figure 6:
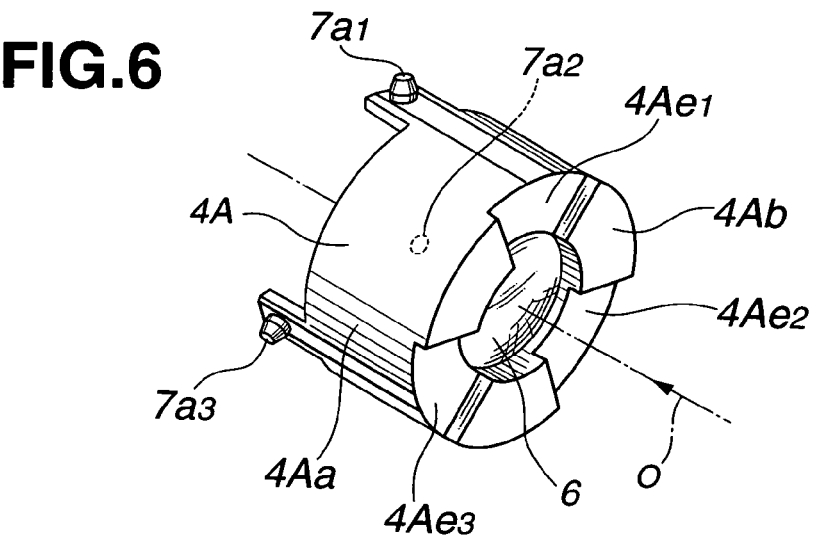
FIG. 6 is a perspective view of a linearly moving frame of a lens barrel of a second embodiment of the present invention.

FIG. 6 is a perspective view of a linearly moving frame of a lens barrel of the second embodiment. FIG. 7 is a front elevational view of the linearly moving frame. FIG. 8 is a view showing a state in which the linearly moving frame is hit against an obstacle.

The lens barrel of the second embodiment is different from the lens barrel 1 of the first embodiment only in a shape of a front end surface of a linearly moving frame 4A. A fixed frame 2, a rotary frame 3, a linear movement guide key 5, and further an image pick-up lens 6 held by the linearly moving frame 4A, and cam followers 7a1, 7a2, 7a3, which are applied to the lens barrel, are similar to those of the first embodiment. The similar components are denoted by the same reference numerals as those of FIG. 1, and only a different portion will be described below.

Figure 7:
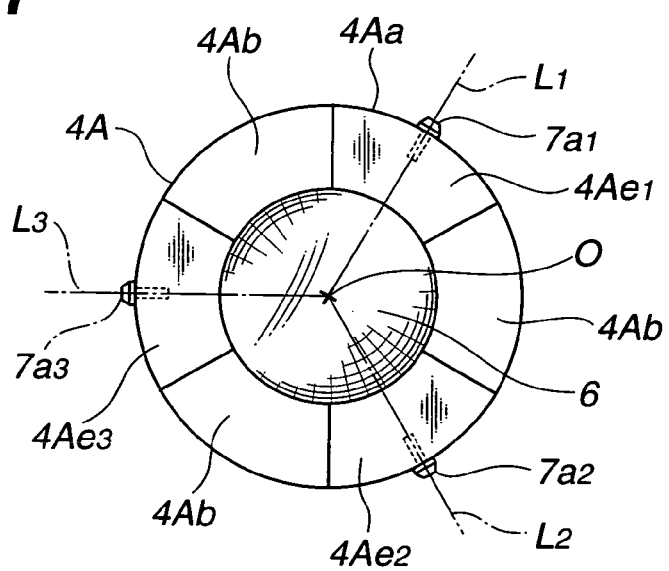
FIG. 7 is a front elevational view of the linearly moving frame of FIG. 6.

In the linearly moving frame 4A applied to the lens barrel of the second embodiment, three concave portions 4Ae1, 4Ae2, 4Ae3 are formed on the front end surface 4Ab of the linearly moving frame 4A by cutting off the front end surface 4Ab at predetermined positions as shown in FIGS. 6 and 7.

The concave portion 4Ae1 is disposed on the front end surface 4Ab of FIG. 7 in a region including a line L1 passing through an extending line in an optical axis O direction at the center of the cam follower 7a1 and the optical axis O. The concave portion 4Ae2 is disposed on the front end surface 4Ab of FIG. 7 in a region including a line L2 passing through an extending line in the optical axis O direction at the center of the cam follower 7a2 and the optical axis O. The concave portion 4Ae3 is disposed on the front end surface 4Ab of FIG. 7 in a region including a line L3 passing through an extending line in the optical axis O direction at the center of the cam follower 7a3 and the optical axis O.

In the lens barrel, the front end surface 4Ab located between the concave portions 4Ae1, 4Ae2, 4Ae3 and divided into three portions acts as projecting external contact members. Each of the divided front end surfaces 4Ab is disposed in a third plane region that is sandwiched between a first plane, which passes through the optical axis O in agreement with a center axis direction in which the linearly moving frame 4A extends and the center axis of one cam follower, and a second plane, which passes through the optical axis O and the center axis of a cam follower adjacent to the above cam follower, and is surrounded by an outer periphery 4Aa and a lens opening portion.

Figure 8:
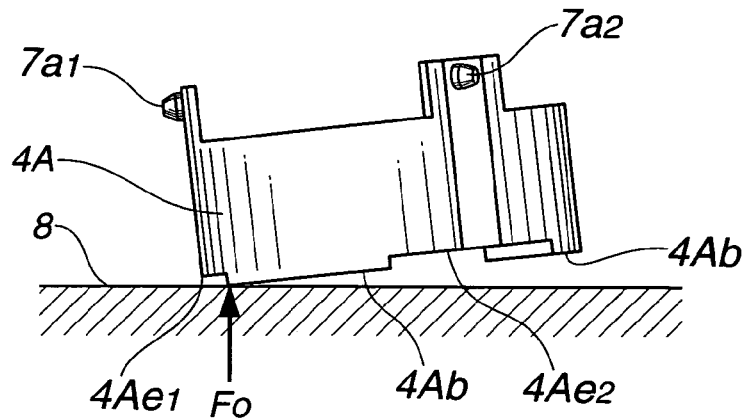
FIG. 8 is a view showing a state in which the linearly moving frame of FIG. 6 is hit against an obstacle.

When the lens barrel of the second embodiment is in a forwardly or inwardly moved state (however, when the lens barrel is of a collapsible barrel type, only when the lens barrel is in a forwardly moved state), if the linearly moving frame 4A is dropped onto an external obstacle 8, for example, a floor or the ground with its front end surface 4Ab side facing downward, any one or a plurality of the divided front end surfaces 4Ab are hit against the external obstacle 8 at the beginning of collision as shown in FIG. 8, and shock force F0 of collision is received between the cam follower 7a1 to 7a3 of the linearly moving frame 4A and the cam grooves 3c of the rotary frame 3.

Since the front end surface 4Ab divided into the three portions are located in the regions among the cam followers 7a1, 7a2, 7a3 as described above, even if the shock force F0 acts on front end surface 4Ab, the shock force F0 is received by at least two adjacent cam followers in a dispersed state. Accordingly, the force received by a single cam follower is reduced, thereby it is possible to suppress occurrence of a disadvantage such as disengagement and breakage of the cam followers, damage of the cam grooves, and the like.

As described above, the lens barrel of the second embodiment can also achieve the same advantage as that of the first embodiment.

Next, a lens barrel of a third embodiment of the present invention will be described using FIGS. 9 to 11.

Figure 9:
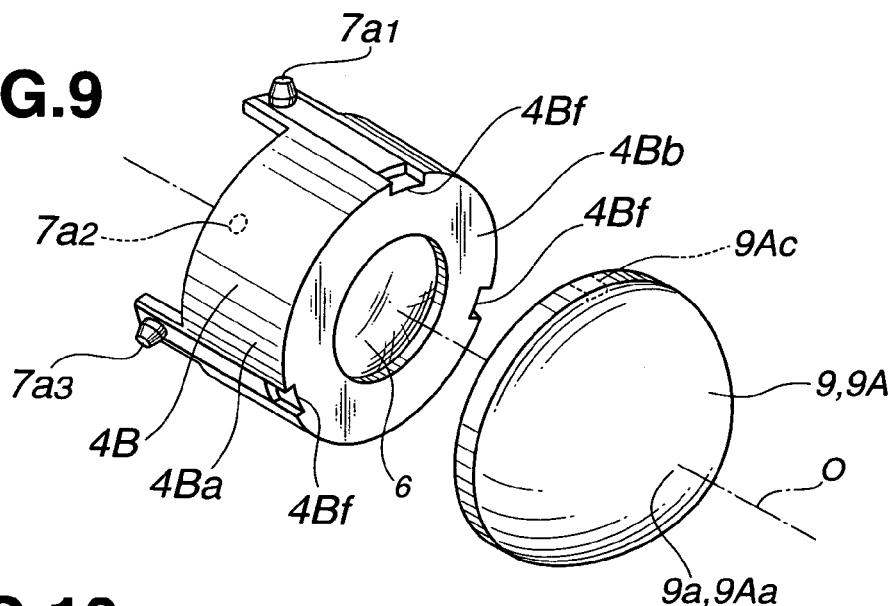
FIG. 9 is a perspective view of a linearly moving frame and a lens cap of a lens barrel of the third embodiment and a modification thereof of the present invention.

FIG. 9 is a perspective view of a linearly moving frame and a lens cap of a lens barrel of the third embodiment and a modification of it. FIG. 10 is a front elevational view of the lens cap mounted on the linearly moving frame 4B. FIG. 11 is a view showing a state in which the lens cap mounted on the linearly moving frame is hit against an obstacle.

The lens barrel of the third embodiment is arranged such that a lens cap (protection cap) 9 serving as a lens barrel external attachment member is detachably mounted on a linearly moving frame 4B in the arrangement of the lens barrel 1 of the first embodiment. A fixed frame 2, a rotary frame 3, a linear movement guide key 5, and further an image pick-up lens 6 held by the linearly moving frame 4B, and cam followers 7a1, 7a2, 7a3, which are applied to the lens barrel, are similar to those of the first embodiment. The similar components are denoted by the same reference numerals as those of FIG. 1, and only a different portion will be described below.

The lens cap 9, which can be detachably mounted on the front surface of the linearly moving frame 4B, is a member having a spherical surface with an apex 9a forming an external contact member.

Figure 11:
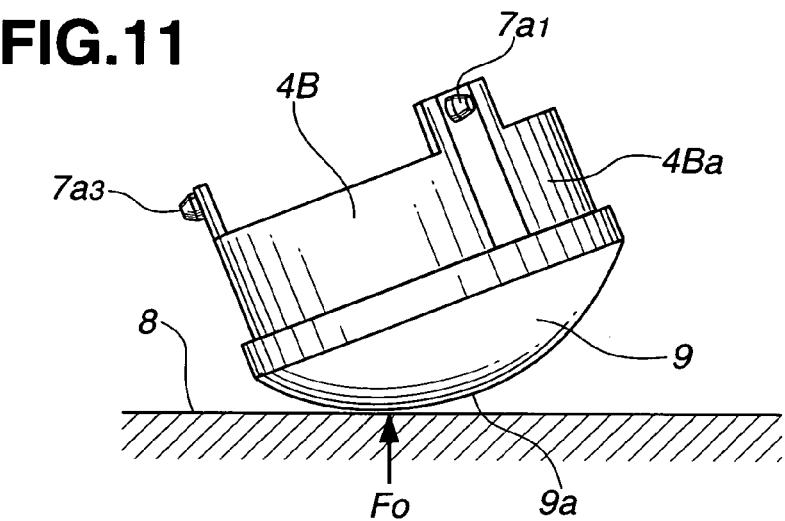
FIG. 11 is a view showing a state in which the lens cap mounted on the linearly moving frame of FIG. 9 is hit against an obstacle.

If the lens barrel of the third embodiment is dropped onto an external obstacle 8, for example, a floor or the ground with the lens cap 9 facing downward in a state in which the lens barrel is moved forward or rearward and the lens cap 9 is mounted on the linearly moving frame 4B, the spherical portion of the lens cap 9 is hit against the external obstacle 8 at the beginning of collision as shown in FIG. 11.

The shock force F0 received by the spherical portion of the lens cap 9 is dispersed to the cam followers 7a1, 7a2, 7a3 of the linearly moving frame 4B, respectively, and received by cam grooves 3c of the rotary frame 3. Accordingly, the the force received by a single cam follower is reduced, thereby it is possible to suppress occurrence of a disadvantage such as disengagement and breakage of the cam followers, damage of the cam grooves, and the like.

In a camera to which the lens barrel of the third embodiment is applied, it is contemplated that when the camera is carelessly dropped or hit against an obstacle, the lens barrel is covered with the lens cap 9 in many cases. In this state, the breakage of the cam followers and the damage of the cam grooves described above can be more effectively prevented.

Although the lens cap 9 described above has the spherical surface, there can be proposed a lens cap 9A serving as an external attachment member with a convex curved surface having a single convex apex 9Aa for forming an external contact member as a modification of the lens cap 9.

Figure 10:
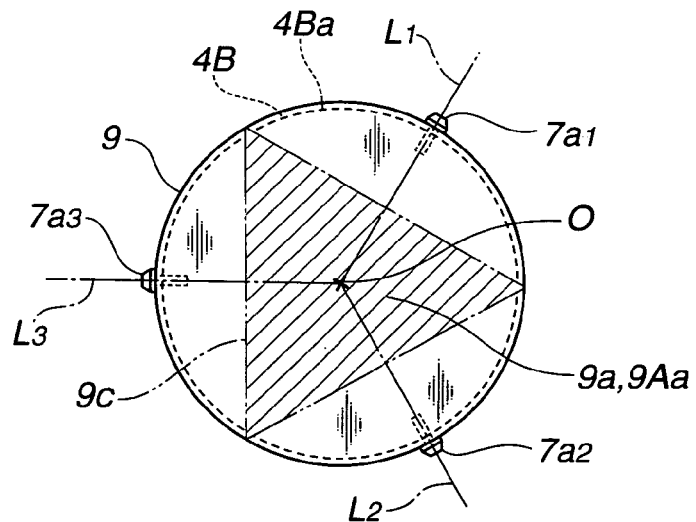
FIG. 10 is a front elevational view of the lens cap mounted on the linearly moving frame of FIG. 9.

The position of the convex apex 9Aa on the surface of the lens cap 9A of the modification is located on a triangular region 9c shown in FIG. 10. In a state in which the lens cap 9A of the modification is mounted on the linearly moving frame 4B, the triangular region 9c has apexes located at positions excluding lines L1, L2, L3 shown in FIG. 10 that pass through a common optical axis O and extending lines in an optical axis direction at the centers of the respective cam followers 7a1, 7a2, 7a3.

In the lens cap 9A, to dispose the convex apex 9Aa at a position in the triangular region, the position of the linearly moving frame 4B at which the lens cap 9A is mounted must be regulated. Concave portions 4Bf are disposed at the front positions of the cam followers 7a1, 7a2, 7a3 of the linearly moving frame 4B, respectively, and convex portions 9Ac to be fitted to the concave portions 4Bf are disposed on the lens cap 9A side. When the lens cap 9A is mounted, the convex portions 9Ac are fitted to the concave portions 4Bf. Accordingly, in a state in which the lens cap 9A is mounted, the convex apex 9Aa of the lens cap 9A is inevitably located in the triangular region.

Even if the lens barrel is dropped from the lens cap 9A side in a state in which the lens cap 9A of the modification is mounted on the linearly moving frame 4B, the convex apex 9Aa of the lens cap 9A is hit against the external obstacle 8 in the vicinity thereof at the beginning of collision. The shock force F0 received by the vicinity of the convex apex 9Aa is dispersed to at least two of the cam followers 7a1, 7a2, 7a3 of the linearly moving frame 4B, respectively and received by the cam grooves 3c of the rotary frame 3.

Accordingly, the force received by a single cam follower is reduced, thereby it is possible to suppress occurrence of a disadvantage such as disengagement and breakage of the cam followers, damage of the cam grooves, and the like. Note that, although the concave portions 4Bf are disposed at the three positions in the modification, the number of them is not particularly limited.

Next, a lens barrel of a fourth embodiment of the present invention will be described using FIGS. 12 and 13.

Figure 12:
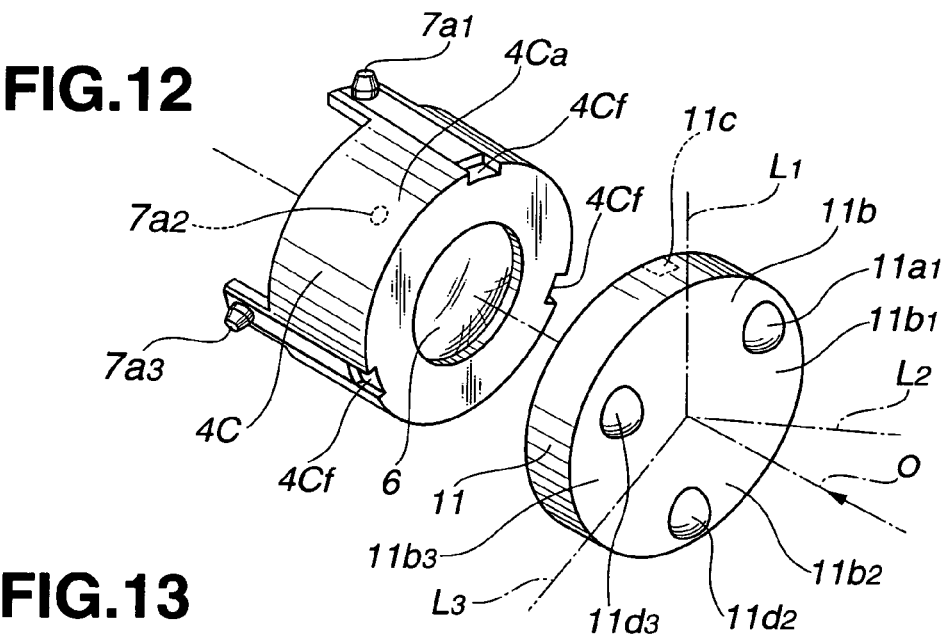
FIG. 12 is a perspective view of a linearly moving frame and a lens cap of a lens barrel of a fourth embodiment of the present invention.

FIG. 12 is a perspective view of a linearly moving frame and a lens cap of the lens barrel of the fourth embodiment. FIG. 13 is a view showing a state in which the lens cap mounted on the linearly moving frame is hit against an obstacle.

The lens barrel of the fourth embodiment is arranged such that a lens cap (protection cap) 11 serving as a lens barrel external attachment member is detachably mounted on a linearly moving frame 4C in the arrangement of the lens barrel 1 of the first embodiment. A fixed frame 2, a rotary frame 3, a linear movement guide key 5, and further an image pick-up lens 6 held by the linearly moving frame 4C, and cam followers 7a1, 7a2, 7a3, which are applied to the lens barrel, are similar to those of the first embodiment. The similar components are denoted by the same reference numerals as those of FIG. 1, and only a different portion will be described below.

As shown in FIG. 12, concave portions 4Cf are disposed to a front portion of the outer periphery 4Ca of the linearly moving frame 4C, respectively at corresponding positions in front of the cam followers 7a1, 7a2, 7a3.

The lens cap 11 detachably mounted on the front surface of the linearly moving frame 4C is an external attachment member which has three projections 11d1, 11d2, 11d3 serving as convex-spherical-shaped external contact members projecting from the front end surface 11b of the lens cap 11 in a forward direction of an optical axis O and is further provided with convex portions 11c formed to the inner periphery of the engagement portion of the lens cap 11 to be engaged with the linearly moving frame 4C so that the convex portions 11c are fitted to the concave portions 4Cf.

In a state in which the lens cap 11 is mounted on the linearly moving frame 4C by fitting the convex portions 11c to the concave portions 4Cf, the three projections 11d1, 11d2, 11d3 of the lens cap 11 are located at positions having a predetermined relation to the linearly moving frame 4C.

More specifically, in a state in which the lens cap 11 is mounted on the linearly moving frame 4C, the projections 11d1 is disposed to a third plane region that is sandwiched between a first plane, which passes through the optical axis O in agreement with a center axis direction in which the linearly moving frame 4C extends and the center axis of the cam follower 7a1, and a second plane, which passes through the optical axis O and the center axis of the cam follower 7a2, and is surrounded by the outer periphery of the lens cap 11. Specifically, as shown in FIG. 12, the projection 11d1 is disposed to a region 11b1 which is surrounded by a line L1 passing through an extending line in the optical axis O direction at the center of the cam follower 7a1 on the front end surface 11b and the optical axis O and a line L2 passing through an extending line in the optical axis O direction at the center of the cam follower 7a2 and the optical axis O.

Likewise, the projection 11d2 is also disposed to a region 11b2 which is surrounded by the line L2 on the front end surface 11b and a line L3 passing through an extending line in the optical axis O direction at the center of the cam follower 7a3 and the optical axis O. Further, the projection 11d3 is also disposed to a region 11b3 surrounded by the line L3 and the line L1 on the front end surface 11b.

Figure 13:
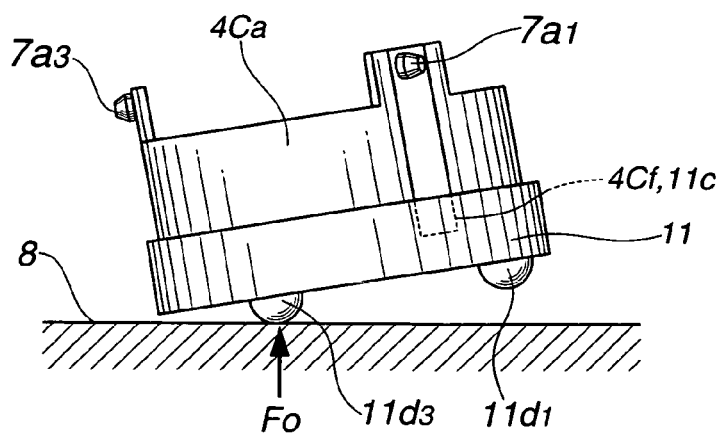
FIG. 13 is a view showing a state in which the lens cap mounted on the linearly moving frame of FIG. 12 is hit against an obstacle.

When the lens barrel of the fourth embodiment is dropped onto an external obstacle 8, for example, a floor or the ground with the lens cap 11 facing downward in a state in which the lens barrel 1 is moved forward or rearward and the lens cap 11 is mounted on the linearly moving frame 4C and, any one or a plurality of the projections 11d1, 11d2, 11d3 are hit against the external obstacle 8 at the beginning of collision as shown in FIG. 13.

The shock force F0 received by the projections of the lens cap 11 is approximately dispersed to any two or three of the cam followers 7a1, 7a2, 7a3 of the linearly moving frame 4C and received by three cam grooves 3c of the rotary frame 3. Accordingly, the force received by a single cam follower is reduced, thereby it is possible to suppress occurrence of a disadvantage such as disengagement and breakage of the cam followers, damage of the cam grooves, and the like.

Even a camera, to which the lens barrel of the fourth embodiment is applied, can effectively suppress breakage of the cam followers and damage of the cam grooves when the camera is carelessly dropped or hit against an obstacle in a state in which the lens cap is mounted thereon likewise the third embodiment. Note that although the concave portions 4Cf are disposed at the three positions in the fourth embodiment, the number of them is not particularly limited.

Next, a lens barrel of a fifth embodiment of the present invention will be described using FIGS. 14 and 15.

Figure 14:
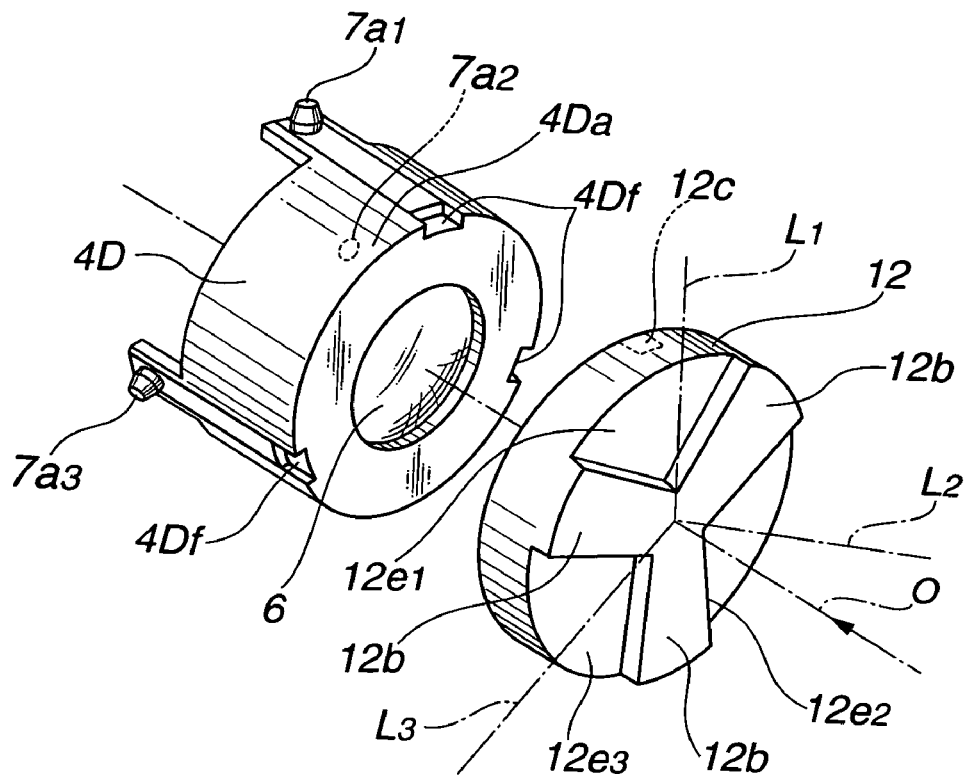
FIG. 14 is a perspective view of a linearly moving frame and a lens cap of a lens barrel of a fifth embodiment of the present invention.

FIG. 14 is a perspective view of a linearly moving frame and a lens cap of a lens barrel of the fifth embodiment. FIG. 15 is a view showing a state in which the lens cap mounted on the linearly moving frame is hit against an obstacle.

The lens barrel of the fifth embodiment is arranged such that a lens cap (protection cap) 12 serving as a lens barrel external attachment member is detachably mounted on a linearly moving frame 4D in the arrangement of the lens barrel 1 of the first embodiment. A fixed frame 2, a rotary frame 3, a linear movement guide key 5, and further an image pick-up lens 6 held by the linearly moving frame 4D, and cam followers 7a1, 7a2, 7a3, which are applied to lens barrel, are similar to those of the first embodiment. The similar components are denoted by the same reference numerals as those of FIG. 1, and only a different portion will be described below.

As shown in FIG. 14, concave portions 4Df are disposed to a front portion of the outer periphery 4Da of the linearly moving frame 4D, respectively at corresponding positions in front of the cam followers 7a1, 7a2, 7a3.

As shown in FIG. 14, the lens cap 12 detachably mounted on the front surface 12b of the linearly moving frame 4D is an external attachment member which has three concave portions 12e1, 12e2, 12e3 on the front end surface 12b and is further provided with convex portions 12c formed to the inner periphery of the engaging portion of the lens cap 12 to be engaged with the linearly moving frame 4D so that the convex portions 12c are fitted to the concave portions 4Df.

The three concave portions 12e1, 12e2, 12e3 of the lens cap 12 are disposed at predetermined positions by cutting off the front end surface 12b at three positions.

That is, the concave portion 12e1 is disposed to a region including a line L1 passing through an extending line extending in an optical axis O direction at the center of the cam follower 7a1 an optical axis O on the front end surface 12b and in a state in which the lens cap 12 is mounted on the linearly moving frame 4D. The concave portion 12e2 is disposed to a region including a line L2 passing through an extending line in the optical axis O direction at the center of the cam follower 7a2 and the optical axis O on the front end surface 12b. The concave portion 12e3 is disposed to a region including a line L3 passing through an extending line in the optical axis O direction at the center of the cam follower 7a3 and the optical axis O on the front end surface 12b.

In the lens cap 12, the front end portion 12b located between the concave portions 12e1, 12e2, 12e3 and divided into three portions acts as projecting external contact members. Each of the divided front end surfaces 12b is disposed in a third plane that is sandwiched between a first plane, which passes through the optical axis O in agreement with a center axis direction in which the linearly moving frame 4D extends and the center axis of one cam follower, and a second plane, which passes through the optical axis O and the center axis of a cam follower adjacent to the above cam follower, and is surrounded by the outer periphery 4Da.

Figure 15:
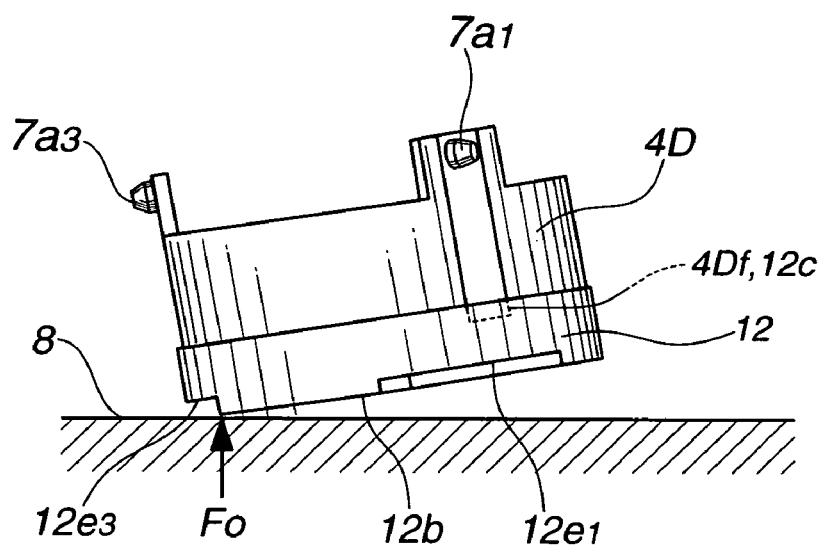
FIG. 15 is a view showing a state in which the lens cap mounted on the linearly moving frame of FIG. 14 is hit against an obstacle.

When the lens barrel of the fifth embodiment is in a state in which the lens barrel is moved forward or rearward with the lens cap 12 mounted thereon, if the lens barrel is dropped onto an external obstacle 8, for example, a floor or the ground with the lens cap 12 facing downward, any one or a plurality of the divided front end surfaces 12b are hit against the external obstacle 8 at the beginning of collision as shown in FIG. 15, and the shock force F0 of the collision is received by the cam followers 7a1 to 7a3 of the linearly moving frame 4D and the cam grooves 3c of the rotary frame 3.

As described above, since the front end surface 12b divided into the three portions are located in the regions among the cam followers 7a1, 7a2, 7a3, even if the shock force F0 acts on front end surface 12b, the shock force F0 is received by at least two adjacent cam followers in a dispersed state. Accordingly, the force received by a single cam follower is reduced, thereby it is possible to suppress occurrence of a disadvantage such as disengagement and breakage of the cam followers, damage of the cam grooves, and the like.

As described above, even the lens barrel of the fifth embodiment can also achieve the same advantage as that of the third embodiment and the modification thereof. Note that although the concave portions 4Df are disposed at the three positions in the fifth embodiment, the number of them is not particularly limited.

Next, a lens barrel of a sixth embodiment of the present invention will be described using FIGS. 16 and 17.

Figure 16:
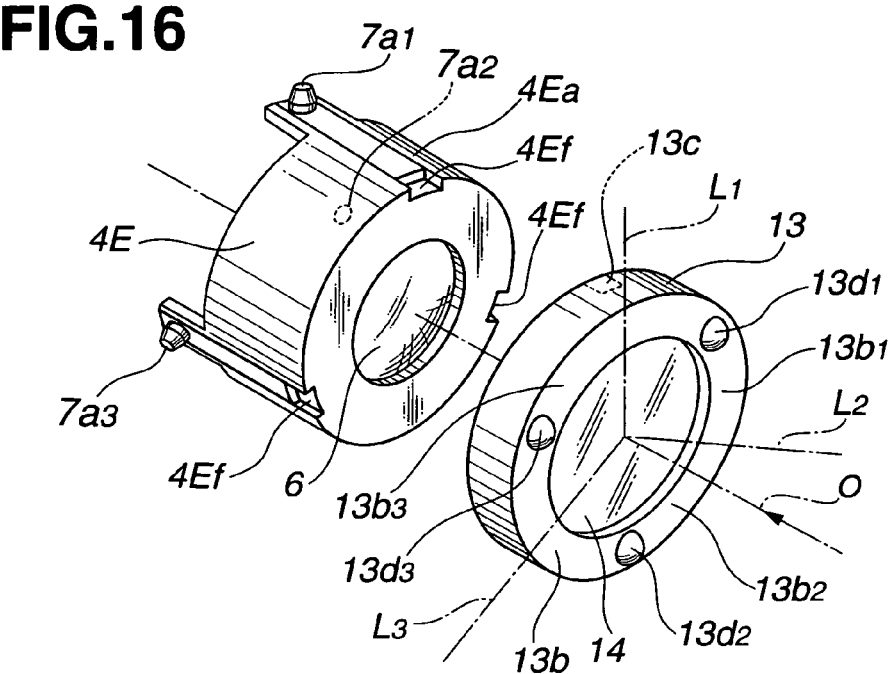
FIG. 16 is a perspective view of a linearly moving frame and a filter ring of a lens barrel of a sixth embodiment of the present invention.

FIG. 16 is a perspective view of a linearly moving frame and a filter ring of a lens barrel of the sixth embodiment. FIG. 17 is a view showing a state in which the filter ring mounted on the linearly moving frame 4E is hit against an obstacle.

The lens barrel of the sixth embodiment is arranged such that a filter ring (filter holding member) 13 as a lens barrel external attachment member is detachably mounted on a linearly moving frame 4E in the arrangement of the lens barrel 1 of the first embodiment. A fixed frame 2, a rotary frame 3, a linear movement guide key 5, and further an image pick-up lens 6 held by the linearly moving frame 4E, and cam followers 7a1, 7a2, 7a3, which are applied to the lens barrel, are similar to those of the first embodiment. The similar components are denoted by the same reference numerals as those of FIG. 1, and only a different portion will be described below.

As shown in FIG. 16, concave portions 4E*f* are disposed to a front portion of the outer periphery 4E*a* of the linearly moving frame 4E, respectively at corresponding positions in front of the cam followers 7*a*1, 7*a*2, 7*a*3.

As shown in FIG. 16, the filter ring 13, which is detachably mounted on the front surface of the linearly moving frame 4E, is an external attachment member having an optical filter 14 disposed to an filter opening, three projections 13*d*1, 13*d*2, 13*d*3 serving as external contact members, and further convex portions 13*c*. Each of the three projections 13*d*1, 13*d*2, 13*d*3 has a convex-spherical-shaped shape projecting in the forward direction of an optical axis, and the convex portions 13*c* are fitted to concave portions 4E*f* formed to the inner periphery of an engagement portion of the linearly moving frame 4E.

In a state in which the filter ring 13 is mounted on the linearly moving frame 4E by fitting the convex portions 13*c* to the concave portions 4E*f*, the three projections 13*d*1, 13*d*2, 13*d* 3 are located at the positions on the front end surface 13*b* in relation to the positions of the cam followers 7*a*1, 7*a*2, 7*a*3.

That is, in a state in which the filter ring 13 is mounted on the linearly moving frame 4E, the projection 13*d*1 is disposed in a third plane region that is sandwiched between a first plane, which passes through the optical axis O in agreement with a center axis direction in which the linearly moving frame 4E extends and the center axis of the cam follower 7*a*1, and a second plane, which passes through the optical axis O and the center axis of the cam follower 7*a*2, and is surrounded by the outer periphery of the filter ring 13 and the filter opening. Specifically, in FIG. 16, the projection 13*d*1 is disposed to a region 13*b*1 which is surrounded by a line L1 passing through an extending line in the optical axis O direction at the center of the cam follower 7*a*1 and the optical axis O on the front end surface 13*b* and a line L2 passing through an extending line in the optical axis O direction at the center of the cam follower 7*a*2 and the optical axis O.

Likewise, the projection 13*d*2 is also disposed to a region 13*b*2 which is surrounded by the line L2 on the front end surface 13*b* and a line L3 passing through an extending line in the optical axis O direction at the center of the cam follower 7*a*3 and the optical axis O. Further, the projection 13*d*3 is also disposed to a region 13*b*3 surrounded by the line L3 and the line L1 on the front end surface 13*b*.

Figure 17:
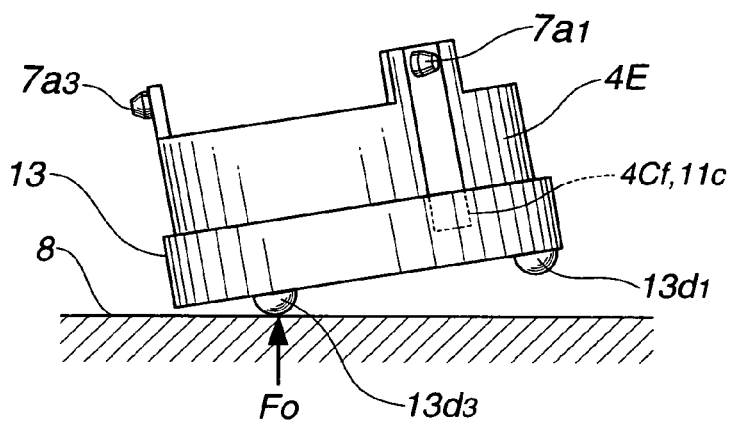
FIG. 17 is a view showing a state in which the filter ring mounted on the linearly moving frame of FIG. 16 is hit against an obstacle.

When the lens barrel of the sixth embodiment is moved forward or rearward with the filter ring 13 mounted on the linearly moving frame 4E, if it is dropped onto an external obstacle 8, for example, a floor or the ground with the filter ring 13 facing downward, any one or a plurality of the projections 13*d*1, 13*d*2, 13*d*3 are hit against the external obstacle 8 at the beginning of collision as shown in FIG. 17, and the shock force F0 of the collision is received by the cam followers 7*a*1 to 7*a*3 of the linearly moving frame 4E and cam grooves 3*c* of the rotary frame 3.

Since the projections 13*d*1, 13*d*2, 13*d*3 are located in the regions among cam followers 7*a*1, 7*a*2, 7*a*3 on the linearly moving frame 4E side as described above, the shock force F0 is received by at least two adjacent cam followers in a dispersed state. Accordingly, the force receive by a single cam follower is reduced, thereby it is possible to suppress occurrence of a disadvantage such as disengagement and breakage of the cam followers, damage of the cam grooves, and the like thereof.

As described above, the lens barrel of the sixth embodiment can also achieve the same advantage as that of the third embodiment and the modification thereof. Note that although the concave portions 4E*f* are disposed at the three positions in the sixth embodiment, the number of them is not particularly limited.

Next, a lens barrel of a seventh embodiment of the present invention will be described using FIGS. 18 and 19.

Figure 18:
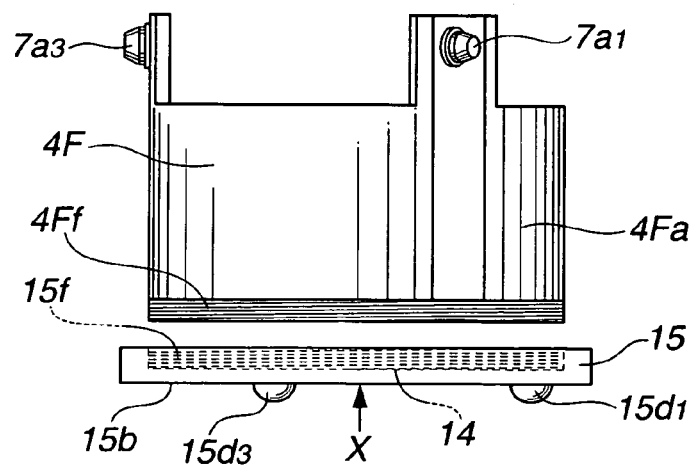
FIG. 18 is a side elevational view of a linearly moving frame and a filter ring of a lens barrel of a seventh embodiment of the present invention in a state in which the linearly moving frame is separated from the filter ring.

FIG. 18 is a side elevational view of a linearly moving frame and a filter ring of the lens barrel in a state in which they are separated from each other. FIG. 19 is a view on arrow in an X-direction of FIG. 18.

The lens barrel of the seven embodiment is arranged such that a filter ring (filter holding member) 15 as a lens barrel external attachment member is mounted on a linearly moving frame 4F by being screwed thereto in the arrangement of the lens barrel 1 of the first embodiment. A fixed frame 2, a rotary frame 3, a linear movement guide key 5, and further an image pick-up lens 6 held by the linearly moving frame 4F, and cam followers 7*a*1, 7*a*2, 7*a*3, which are applied to the lens barrel, are similar to those of the first embodiment. The similar components are denoted by the same reference numerals as those of FIG. 1, and only a different portion will be described below.

As shown in FIG. 18, a male screw portion 4F*f* is disposed to a front portion of the linearly moving frame 4F on the outer periphery 4F*a* thereof so that it is screwed to the filter ring 15.

Figure 19:
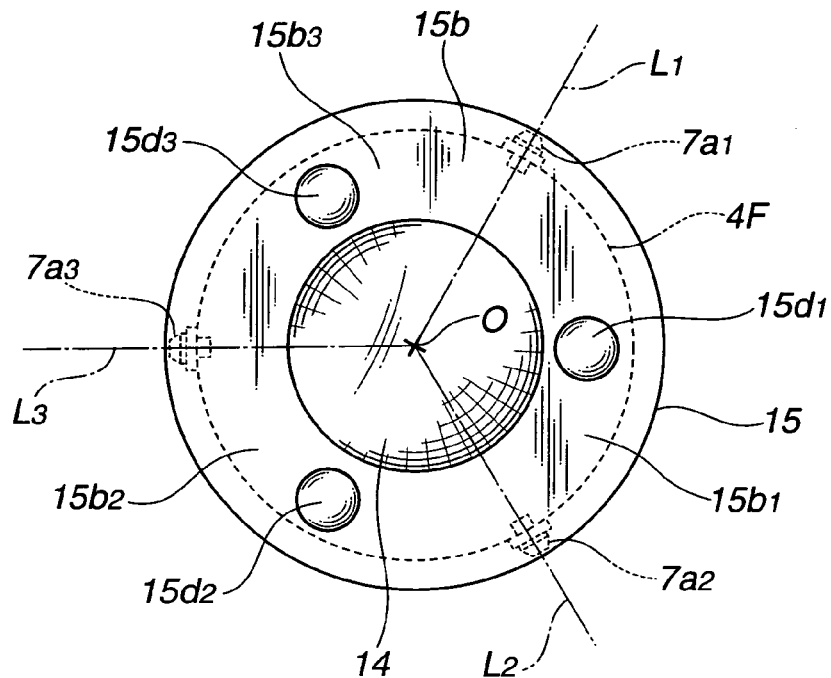
FIG. 19 is a view on arrow in an X-direction of FIG. 18.

As shown in FIGS. 16, 19, the filter ring 15 is a metal or resin external attachment member having an optical filter 14 disposed to a filter opening and has a female screw 15*f* formed to the inner periphery of it so that the female screw 15*f* is screwed on the male screw portion 4F*f*. Projections 15*d*1, 15*d*2, 15*d*3 serving as three convex-spherical-shaped external contact members projecting in the forward direction of an optical axis O are disposed on the front end surface 15*b* of the filter ring 15. The projections are disposed in relation to the positions of the cam followers 7*a*1, 7*a*2, 7*a*3 in a state in which the filter ring 15 is screwed on the linearly moving frame 4F.

That is, in a state in which that the filter ring 15 is screwed on and attached to the linearly moving frame 4F, the projection 15*d*1 is disposed in a third plane region that is sandwiched between a first plane, which passes through the optical axis O in agreement with a center axis direction in which the linearly moving frame 4F extends and the center axis of the cam follower 7*a*1, and a second plane, which passes through the optical axis O and the center axis of the cam follower 7*a*2, and is surrounded by the outer periphery of the filter ring 15 and the filter opening.

Specifically, as shown in FIG. 19, the projection 15*d* 1 is disposed to a region 15*b*1 which is surrounded by a line L1 passing through an extending line in the optical axis O direction at the center of the cam follower 7*a*1 on the front end surface 15*b*1 and the optical axis O and a line L2 passing through an extending line in the optical axis O direction at the center of the cam follower 7*a*2 and the optical axis O.

Likewise, the projection 15*d*2 is also disposed to a region 15*b*2 which is surrounded by the line L2 on the front end surface 15*b* and a line L3 passing through an extending line in the optical axis O direction at the center of the cam follower 7*a*3 and the optical axis O. Further, the projection 15*d*3 is also disposed to a region 15*b*3 surrounded by the line L3 and the line L1 on the front end surface 15*b*.

When the lens barrel of the seventh embodiment is moved forward or rearward with the filter ring 15 mounted on the linearly moving frame 4F thereof, if it is dropped onto an external obstacle 8, for example, a floor or the ground, for example, a floor or the ground facing downward, any one or a plurality of the projections 15*d*1, 15*d*2, 15*d*3 are hit against the external obstacle 8 at the beginning of collision, and the shock force F0 of the collision is received by the cam followers 7a1 to 7a3 of the linearly moving frame 4F and cam grooves 3c of the rotary frame 3.

Since the projections 15d1, 15d2, 15d3 are located in the regions among cam followers 7a1, 7a2, 7a3 on the linearly moving frame 4F side, the shock force is received by at least two adjacent cam followers in a dispersed state. Accordingly, the force received by a single cam follower is reduced, thereby it is possible to suppress occurrence of a disadvantage such as disengagement and breakage of the cam followers, damage of the cam grooves, and the like.

As described above, the lens barrel of the seventh embodiment can also achieve the same advantage as that of the third embodiment and the modification thereof.

Note that an advantage similar to that of the sixth embodiment can be also achieved by also providing a lens cap for protecting lens, which can be screwed on and attached to the linearly moving frame 4F, with projections 15d1, 15d2, 15d3 similar to those of the filter ring 15 described above in place of the filter ring 15 applied to the lens barrel of the seventh embodiment.

Next, a lens barrel of an eighth embodiment of the present invention will be described using FIGS. 20 to 22.

Figure 20:
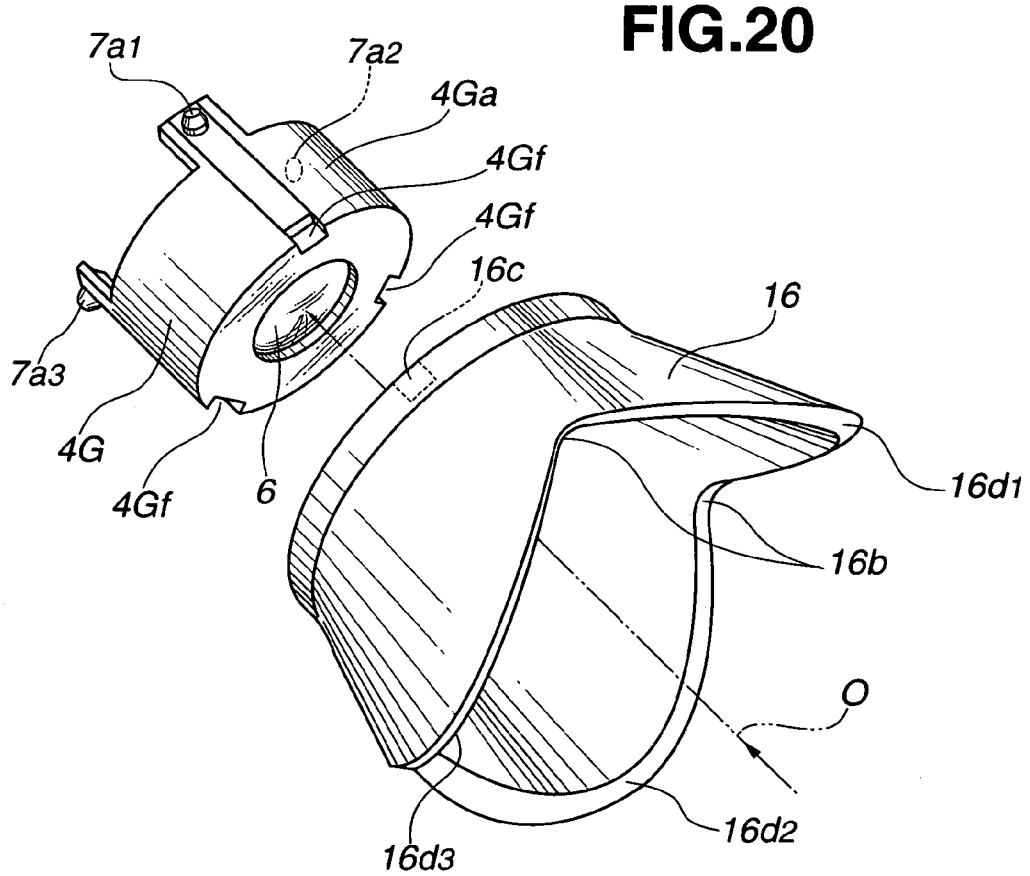
FIG. 20 is a perspective view of a linearly moving frame and a lens hood of a lens barrel of an eighth embodiment of the present invention.

FIG. 20 is a perspective view of a linearly moving frame of and a lens hood of the eighth embodiment of the present invention. FIG. 21 is a front elevational view of the lens hood mounted on the linearly moving frame. FIG. 22 is a view how shock force acts when an obstacle hit against the lens hood mounted on the linearly moving frame.

The lens barrel of the eighth embodiment is arranged such that a lens hood 16 as a lens barrel external attachment member is detachably mounted on a linearly moving frame 4G in the arrangement of the lens barrel 1 of the first embodiment. A fixed frame 2, a rotary frame 3, a linear movement guide key 5, and further an image pick-up lens 6 held by the linearly moving frame 4Q, and cam followers 7a1, 7a2, 7a3, which are applied to the lens barrel, are similar to those of the first embodiment. The similar components are denoted by the same reference numerals as those of FIG. 1, and only a different portion will be described below.

As shown in FIG. 20, concave portions 4Gf are disposed to a front portion the outer periphery 4Ga of the linearly moving frame 4G, respectively at corresponding positions in front of the cam followers 7a1, 7a2, 7a3.

Figure 21:
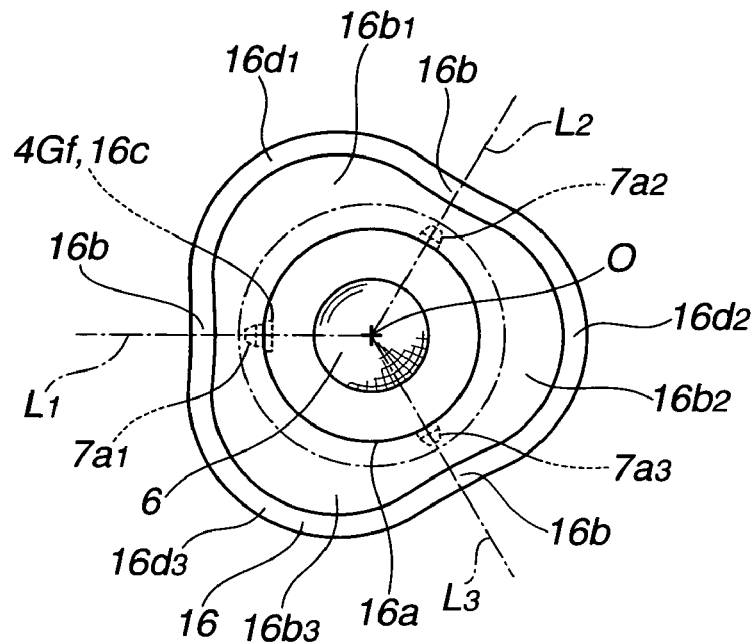
FIG. 21 is a front elevational view of the lens hood mounted on the linearly moving frame of FIG. 20.

As shown in FIGS. 20 and 21, the lens hood 16 that can be detachably mounted on the front surface of the linearly moving frame 4G is an external attachment member having a central opening 16a, hood convex portions 16d1, 16d2, 16d3 serving as three external contact members and formed to a front portion thereof, three hood concave portions 16b formed among the convex portions. Further, convex portions 16c, which can be fitted to concave portions 4Gf, are formed to the inner periphery of the lens hood 16 in the engage portion thereof engaged with the linearly moving frame 4G.

In a state in which the lens hood 16 is mounted on the linearly moving frame 4G by fitting the convex portions 16c to the concave portions 4Gf, the three hood convex portions 16d1, 16d2, 16d3 are located at positions in relation to the positions of the cam followers 7a1, 7a2, 7a3.

That is, in a state in which the lens hood 16 is mounted on the linearly moving frame 4G, the hood convex portions 16d1 is disposed so as to extend forward from a third plane region that is sandwiched between a first plane, which passes through an optical axis O in agreement with a center axis direction in which the linearly moving frame 4G extends and the center axis of the cam follower 7a1, and a second plane, which passes through the optical axis O and the center axis of the cam follower 7a2, and is surrounded by the outer periphery of a lens hood mounting portion and the central opening 16a.

Specifically, in FIG. 21, the hood convex portion 16d1 is disposed to a region 16b1 surrounded by a line L1 passing through an extending line in the optical axis O direction at the center of the cam follower 7a1 and the optical axis O and a line L2 passing through an extending line in the optical axis O direction at the center of the cam follower 7a2 and the optical axis O.

Likewise, the hood convex portion 16d2 is also disposed to a region 16b2 surrounded by the line L2 and a line L3 passing through an extending line in the optical axis O direction at the center of the cam follower 7a3 and the optical axis. Further, hood convex portion 16d3 is also disposed to a region 16b3 surrounded by the line L3 and the line L1.

Figure 22:
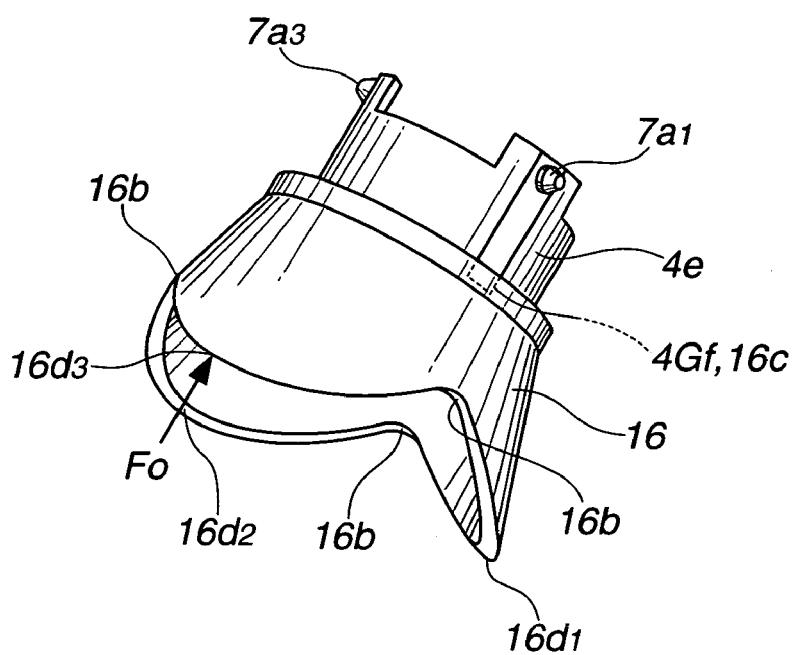
FIG. 22 is a view showing how shock force acts when an obstacle is hit against the lens hood mounted on the linearly moving frame.

When the lens barrel of the eighth embodiment is moved forward or rearward with the lens hood 16 mounted on the linearly moving frame 4Q if it is dropped onto an external obstacle 8, for example, a floor or the ground with the lens hood 16 facing downward, any one or a plurality of the hood projections 16d1, 16d2, 16d3 are hit against the external obstacle 8 at the beginning of collision as shown in FIG. 22, and the shock force F0 of the collision is received by the cam followers 7a1 to 7a3 of the linearly moving frame 4G and cam grooves 3c of the rotary frame 3.

As described above, since the hood convex portions 16d1, 16d2, 16d3 are located in the regions among the cam followers 7a1, 7a2, 7a3 on the linearly moving frame 4G side, the shock force F0 is received by at least two adjacent cam followers in a dispersed state. Accordingly, the force received by a single cam follower is reduced, thereby it is possible to suppress occurrence of a disadvantage such as disengagement and breakage of the cam followers, damage of the cam grooves, and the like.

As described above, the lens barrel of the eighth embodiment on which the lens hood is mounted, can also achieve the same advantage as the lens barrel of the third embodiment and the modification thereof. Note that although the concave portions 4Gf are disposed at three positions in the eighth embodiment, the number of them is not particularly limited.

It should be noted that, the cam followers 7a1, 7a2, 7a3 disposed to the linearly moving frame of the respective embodiments described above are not only fixed to the linearly moving frame by press-fit but also may be molded integrally with the linearly moving frame, and they may be installed by any mode. Further, an inter-mirror-frame support member, which can realize a mechanism for transmitting forward/rearward movement and/or rotation of a mirror frame by sliding in a guide groove, may be employed in addition to a pin structure such as the cam follower. Further, the number of the cam followers is not limited to three and may be two or four or more.

According to the present invention, there can be provided a lens barrel with which the number of parts can be suppressed and stable strength can be obtained regardless of the attitude when it is dropped and a change of an acting state of shock force.

The present invention is not limited to the above embodiments and may be embodied by being variously modified in an embodying stage within a scope that does not depart from the gist of the present invention. Further, since the respective embodiments include inventions in various stages, various inventions may be extracted by appropriately combining a plurality of disclosed constituents.

What is claimed is:

1. A lens barrel comprising:

a first frame member having a plurality of cam grooves;

a second frame member having a first cam follower and a second cam follower fitted to the plurality of cam grooves, respectively; and an external contact member arranged in a region on the end surface of the second frame member which is sandwiched between a first line extending toward the center axis from the first cam follower and a second line extending toward the center axis from the second cam follower adjacent to the first cam follower when the second frame member is viewed from the forward direction of the optical axis of an image pick-up lens held by the second frame member, the external contact member projecting in the direction of the optical axis from the end surface of the second frame member.

2. A lens barrel according to claim 1, wherein the external contact member projects in the direction of the optical axis in an inward region of the outer periphery of the second frame member.

3. A lens barrel according to claim 1, wherein the external contact member is formed to the end surface of the second frame member.

4. A lens barrel system comprising:

a lens barrel having a first frame member including a plurality of cam grooves, a second frame member including a first cam follower and a second cam follower fitted to the plurality of cam grooves, respectively, and an attachment portion for positioning and fixing an external attachment member; and a lens barrel external attachment member having a fitting portion fitted the attachment portion and an external contact member arranged in a region on the end surface of the second frame member, which is sandwiched between a first line extending toward the center axis from the first cam follower and a second line extending toward the center axis from the second cam follower adjacent to the first cam follower when the second frame member is viewed from the forward direction of the optical axis of an image pick-up lens held by the second frame member,when the attachment portion is fitted to the fitting portion so that they are positioned and fixed,the external contact member projecting in the direction of the optical axis from the end surface of the second frame member.

5. A lens barrel system according to claim 4, wherein the lens barrel external attachment member is a lens hood.

6. A lens barrel system according to claim 4, wherein the lens barrel external attachment member is a protection cap.

7. A lens barrel system according to claim 4, wherein the lens barrel external attachment member is a filter holding member for holding an optical filter.

* * * * *